US010849072B1

(12) United States Patent
Bart (10) Patent No.: US 10,849,072 B1
(45) Date of Patent: *Nov. 24, 2020

(54) TRACKING DEVICE BATTERY CONSERVATION

(71) Applicant: Alarm.com Incorporated, Tysons, VA (US)

(72) Inventor: Gary Franklin Bart, Weston, FL (US)

(73) Assignee: Alarm.com Incorporated, Tysons, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/699,818

(22) Filed: Dec. 2, 2019

Related U.S. Application Data

(63) Continuation of application No. 15/949,949, filed on Apr. 10, 2018, now Pat. No. 10,499,337.

(60) Provisional application No. 62/483,765, filed on Apr. 10, 2017.

(51) Int. Cl.
| G06F 1/04 | (2006.01) |
| H04W 52/02 | (2009.01) |
| H04W 4/029 | (2018.01) |

(52) U.S. Cl.
CPC ....... *H04W 52/0251* (2013.01); *H04W 4/029* (2018.02)

(58) Field of Classification Search
CPC ..... H04W 4/025; H04W 4/029; H04W 52/00; H04W 52/0251; H04W 52/0261; H04W 52/0254; H04W 52/80
See application file for complete search history.

(56) References Cited

U.S. PATENT DOCUMENTS

| 5,218,704 | A | 6/1993 | Watts, Jr. et al. |
| 7,003,331 | B2 | 2/2006 | Cromer et al. |
| 2009/0180412 | A1 | 7/2009 | Albert et al. |
| 2011/0171909 | A1* | 7/2011 | Jung ............... H04W 4/029 455/41.2 |
| 2017/0332330 | A1* | 11/2017 | Dhandu ............ H04W 64/006 |
| 2018/0160271 | A1* | 6/2018 | Vutukuri .......... H04W 12/0609 |
| 2018/0196972 | A1* | 7/2018 | Lu .................. H04W 84/18 |

FOREIGN PATENT DOCUMENTS

| CN | 102239731 | 11/2011 |
| EP | 2356860 | 8/2011 |

* cited by examiner

*Primary Examiner* — Munear T Akki
(74) *Attorney, Agent, or Firm* — Fish & Richardson P.C.

(57) ABSTRACT

A method includes generating motion data that reflects movement of the tracking device, comparing the motion data to a motion threshold, determining that the motion data satisfies the motion threshold, based on determining that the motion data satisfies a motion threshold, activating the communication device, receiving, by the monitoring system and from the tracking device, the motion data, based on the motion data, determining, by the monitor system, that the tracking device is outside of a threshold distance of a property monitored by the monitoring system, based on determining that the tracking device is outside of the threshold distance of the property, providing, for output by the monitoring system and to the tracking device, an instruction to transmit location data at a particular frequency, and based on the location data, providing, for output by the monitoring system, data indicating a location of the tracking device.

20 Claims, 4 Drawing Sheets

TRACKING DEVICE BATTERY CONSERVATION

CROSS REFERENCE TO RELATED APPLICATIONS

This application is a continuation of U.S. application Ser. No. 15/949,949, filed Apr. 10, 2018, now allowed, which claims benefit of U.S. Provisional Application No. 62/483,765, filed Apr. 10, 2017, and titled "Tracking Device Battery Conservation." Both of these prior applications are incorporated by reference in their entirety.

TECHNICAL FIELD

This disclosure relates to property monitoring technology.

BACKGROUND

Many people equip homes and businesses with monitoring systems to provide increased security for their homes and businesses.

SUMMARY

Techniques are described for monitoring technology. For example, techniques are described for optimizing the battery life of a tracking device based on utilizing a number of technologies in a specific order based on the power consumption of each technology.

According to an innovative aspect of the subject matter described in this application, a monitoring system that is configured to monitor a property includes a tracking device that includes a motion sensor that is configured to generate motion data that reflects movement of the tracking device and that, when active, consumes a first amount of power and a communication device that, when active, consumes a second amount of power that is greater than the first amount of power. The tracking device is configured to compare the motion data to a motion threshold, based on comparing the motion data to the motion threshold, determine that the motion data satisfies the motion threshold, and based on determining that the motion data satisfies a motion threshold, activate the communication device, and a monitor control unit that is configured to receive, from the communication device of the tracking device, the motion data, based on the motion data, determine that the tracking device is outside of a threshold distance of the property, based on determining that the tracking device is outside of the threshold distance of the property, provide, for output to the tracking device, an instruction to transmit location data at a particular frequency, and based on the location data, provide, for output, data indicating a location of the tracking device.

These and other implementations each optionally include one or more of the following optional features. The communication device may be a short-range radio. The short-range radio is configured to determine, at the particular frequency, another short-range radio device that is in a vicinity of the tracking device, and the tracking device is configured to determine that the other short-range radio device is a known short-range radio device, and based on determining that the other short-range radio device is a known short-range radio device, provide, for output, location data that indicates that the tracking device is located within range of the known short-range radio device.

The short-range radio is configured to determine, at the particular frequency, another short-range radio device that is within range of the tracking device, the tracking device is configured to determine that the other short-range radio device is not a known short-range radio device. The tracking device includes an wireless local area networking transceiver device that, when active, consumes a third amount of power that is greater than the first amount of power and the second amount of power and that is configured to determine a wireless network that is within range of the tracking device based on determining that the other short-range radio device is not a known short-range radio device, and the tracking device is configured to determine that the wireless network is a known wireless network, and based on determining that the wireless network is a known wireless network, provide, for output, location data that indicates that the tracking device is located within range of the known wireless network.

The short-range radio is configured to determine, at the particular frequency, another short-range radio device that is within range of the tracking device, and the tracking device is configured to determine that the other short-range radio device is not a known short-range radio device. The tracking device includes an wireless local area networking transceiver device that, when active, consumes a third amount of power that is greater than the first amount of power and the second amount of power and that is configured to determine a wireless network that is within range of the tracking device based on determining that the other short-range radio device is not a known short-range radio device. The tracking device is configured to determine that the wireless network is not a known wireless network, the tracking device includes a cellular radio that, when active, consumes a fourth amount of power that is greater than the first amount of power, the second amount of power, and the third amount of power and that is configured to determine a location of the tracking device using cellular network access point multilateration based on determining that the wireless network is not a known wireless network. The tracking device is configured to provide, for output, location data that indicates that the location of the tracking device using cellular network access point multilateration.

The tracking device includes a wireless local area networking transceiver that consumes third amount of power that is greater than the first amount of power and the second amount of power, and a cellular radio that consumes a fourth amount of power that is greater than the first amount of power, the second amount of power, and the third amount of power, and the tracking device is configured to communicate using the short-range radio, the wireless local area networking transceiver, or the cellular radio that is within range of a known device and consumes a lowest amount of power. The motion sensor that is configured to generate motion data that reflects movement of the tracking device and that, when active, consumes a first amount of power comprises an accelerometer that is configured to generated accelerometer data, and the monitor control unit is configured to receive the motion data by receiving the accelerometer data from the accelerometer.

The communication device is configured to generate the location data by analyzing the motion data, and provide, for output, the location data. The monitor control unit is configured to determine a location of a user device of a resident of the property, determine a first distance between the user device of the resident and the tracking device, determine a second distance between the user device of the resident and the tracking device, determine that the second distance is less than the first distance, and based on determining that the second distance is less than the first distance, communicate the location data to the user device of the resident at a greater frequency than the particular frequency. The monitor control unit is configured to provide, for output, the data indicating the location of the tracking device by providing, for output, the data indicating the location of the tracking device at the particular frequency.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Battery powered tracking devices have become common place in today's society, and some of these tracking devices utilize local radios, such as, Bluetooth Low-Energy, to provide location awareness related to an object to a user, typically via a Smart Phone application. Sensing devices may be expensive due to the cost of cellular connections, the power demands, cost and size of cellular radio modules, the lack of other types of appropriate radio technologies with adequate geographic coverage, and the cost, size, and power requirements of GPS receivers. Sensing devices have either been expensive or limited to sensing functions that require the user to be nearby, and using radio technology that functions locally, or requires another user in a crowd-sourced environment to be located nearby. As the cost, size, and power requirements of cellular radios have been reduced recently due to new technologies, low-cost tracking of people, pets, vehicles, and other entities, with a combination of cellular and GPS technologies have become possible.

A primary consideration in the success of a tracking device is the size, physical attractiveness, and battery life of the devices. Battery life is directly related to size of the device as larger batteries would require more space. In some implementations, one or more differing technologies may be deployed to determine if a tracking device has moved, to locate the tracker, and to report to a user the determined location of the tracking device. Each of these one or more differing technologies impact the battery life of the tracking device in different amounts. Described are general methodologies for optimizing the battery life of a tracking device, by utilizing the one or more technologies available to the tracker device in a specific method.

Figure 1A:
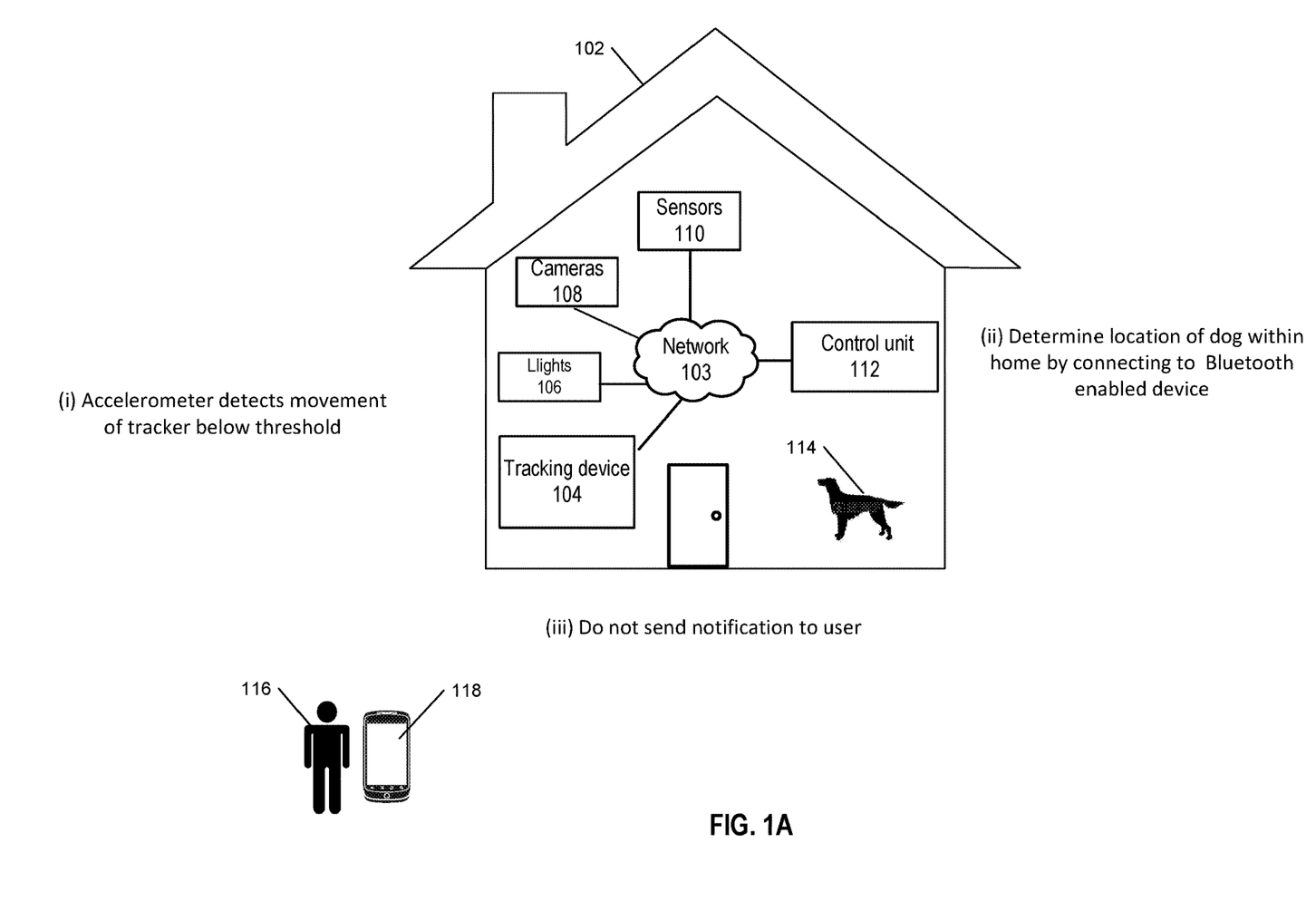
FIGS. 1A and 1B illustrate examples of a system for determining when to send a notification to a user regarding the location of a tracking device.
Figure 1B:
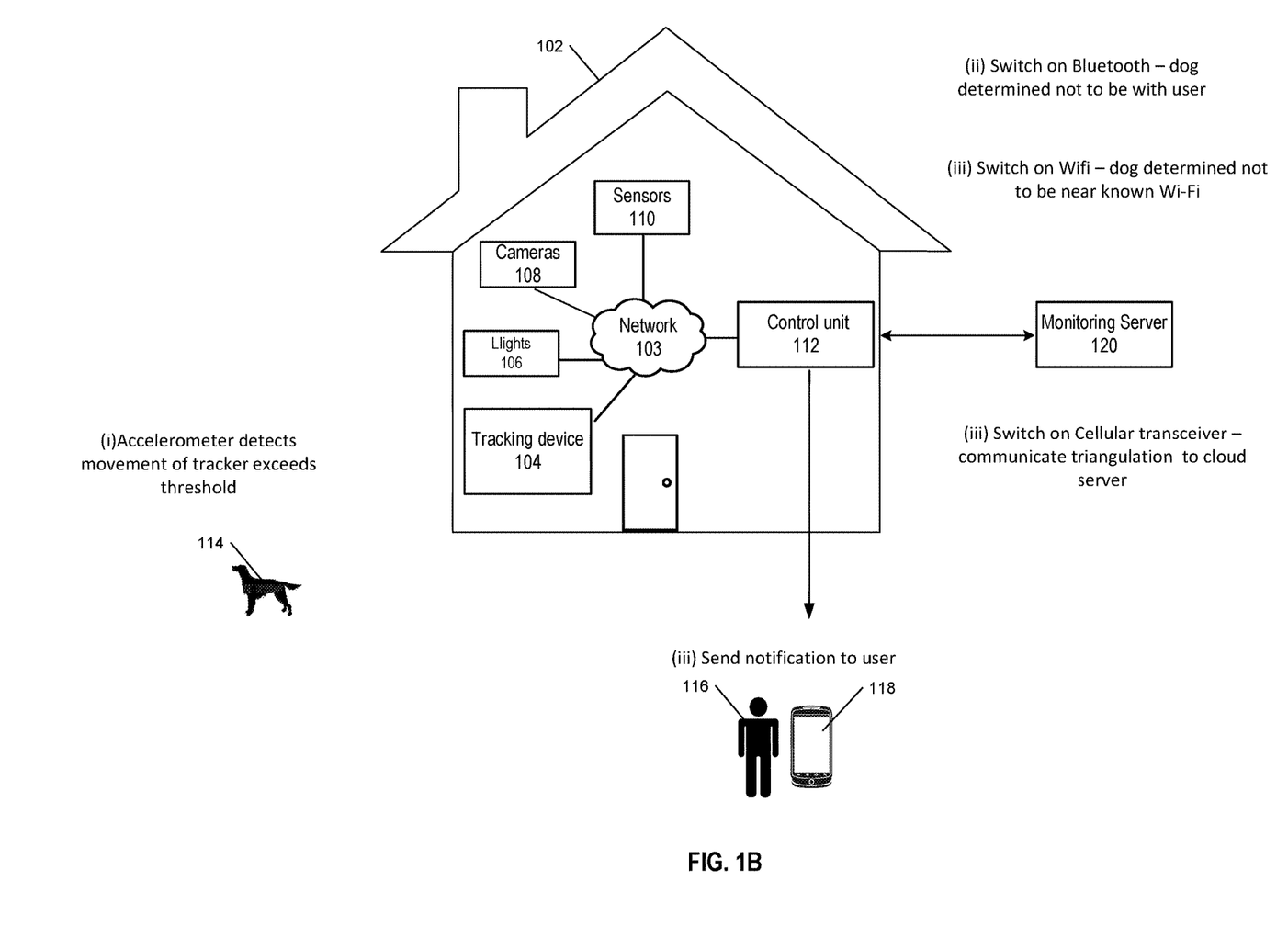

FIGS. 1A and 1B illustrate an example of system for determining when to send a notification to a user regarding the location of a tracking device. The monitored property 102 may be a home or commercial property, and may be monitored by an in-home monitoring system that includes one or more electronic sensors. The monitoring system may include a control unit 112, tracking device 104, one or more lights 106, one or more cameras 108, and one or more sensors 110. The user 116 may affix a tracking device to one or more entities associated with the monitored property 102. For example, the user may attach a tracking device to a child, spouse, car, or pet associated with the monitored property. The tracking device 104 may be capable of deploying one or more different technologies to determine if the tracking device has moved.

The tracking device 104 may be an electronic tracking device that includes an accelerometer, a Bluetooth Low energy radio (BTLE), a Wi-Fi radio transceiver, a cellular transceiver, and a GPS transceiver. The tracking device 104 may be a battery powered device that is controlled by a micro controller unit (MCU). In some examples, the tracking device 104 may include a microphone and a speaker that enables two-way voice communication. The tracking device 104 may be configured by the user 116 through an application that the user may access through the user device 118. The user device 118 may be a smart phone, a tablet, or any other suitable mobile device.

A tracking device 104 may be attached to a dog 114. The tracking device 114 may be configured to optimize the battery life of the device 104. The battery life of the tracking device 104 may be optimized by using the lowest power technology required to determine the current status of the tracking device 104, and by cascading through the use of one or more other technologies by then using the second lowest power technology, followed by the third lowest power technology, and so on. In some implementations, the tracking device 104 is configured by an algorithm that determines the pattern of the technologies used to detect movement and determine the location of the tracking device. An algorithm may be used to determine which of the one or more technologies are used to determine the location of the tracking device based on the particular use case. For example, a tracking device placed on a vehicle may be programmed differently than a tracking device placed on a pet.

For example, as illustrated in 100A, the tracking device 104 attached to the dog 114 may detect movement. The tracking device 104 may include an accelerometer with a state machine, which may be configured to measure "proper acceleration," and may be configured to provide inertial information to the tracking device 104. The accelerometer of the tracking device may determine whether inertial changes match a profile of movement programmed in the state machine, and may be considered a near-zero-power device because it consumes very little power when detecting movement. Based on the accelerometer being a near-zero-power device, the accelerometer technology of the tracking device 104 is the lowest power technology of the tracking device 104. Given the near-zero-power of the accelerometer technology of the tracking device, the accelerometer may be constantly powered on, and is the technology used to detect initial movement of the tracking device 104.

The accelerometer of the tracking device 104 may be programmed to identify a series of movements of the dog 114 that indicate that the dog 114 has moved in a series of linear movements. The accelerometer may determine, based on the movements or the distance travelled, that the dog 114 has not left the monitored property 102. The tracking device 104 does not have to power on the other more other power intense technologies of the tracking device 104 based on the location of the dog being determined by the device to be within the monitored property. The battery life of the tracking device 104 is optimized since high power technologies such as the Bluetooth radio transceiver and Wi-Fi are not used. Because the tracking device 104 determined that the dog 114 is likely inside the property 102, the tracking device 104 does not need to communicate with the user, and therefore a notification is not sent to the user 116. In some implementations, the tracking device 104 may switch on the BTLE radio transmitter for a short period to verify that the dog is within the monitored property. In these implementations, the tracking device 104 may verify the dog's location within the monitored property 102 when the tracking device connects to the Bluetooth enabled control unit 112 at the property. When the dog's location is verified, the BTLE radio transmitter is switched off.

As illustrated in 100B, the dog 114 may leave the monitored property 102. The tracker 104 associated with the dog 114 may determine the movement of the dog based on the movement of the accelerometer. The accelerometer, which is a near-zero-power technology, may constantly be operating, and may detect that the movements of the accelerometer attached to the dog 114 are above a threshold. For example, the movement of the accelerometer may include a series of liner movements that translate into a distance greater than the indoor space of the monitored property 102. Based on detecting that the movements of the accelerometer exceed the threshold, which may indicate that the dog 114 left the monitored property 102, the tracking device 104 may power on the micro controller unit (MCU). The MCU may power on the next lowest level power device, the Bluetooth Low energy (BTLE) radio transmitter. In some implementations, the steps of switching from one technology to another based on the power consumption of the technology, may be determined by the algorithm. In other implementations, the tracker switches from the lowest power technology to the second to lowest power technology, etc. The BTLE radio transmitter is a low power device that attempts to locate the user's device 118, or any other known Bluetooth device (e.g., the control unit 112), by connecting to the device's Bluetooth capability.

When the user's device 118 communicates with the BTLE radio transmitter of the tracking device 104, then the dog is determined to likely be with the user 116. For example, the user may be out with the dog for a walk, or at the vet with the dog. In these examples, the tracking device 104 may then power down the BTLE radio transmitter and the MCU for a particular period of time to continue to reserve battery consumption. In some examples, the tracking device 104 may power down the MCU and the BTLE radio transmitter for an hour. In some examples, the MCU and the BTLE may be powered down until the user's device 118 is a threshold distance from the monitoring property 102. The user's device 118 may connect to the Wi-Fi network at the monitored property 102 and may then communicate to the control unit 112 that the device 118 is connected. When the user device 118 connects to the Wi-Fi this may indicate that the user 116 and the dog 114 are back from the walk. The tracking device 104 may power on the BTLE radio transmitter and communicate through Bluetooth with the control unit 112. Once the tracking device 104 communicates via Bluetooth with the control unit 112 and confirms the dog's presence at the monitored property 102, the BTLE radio transmitter is again powered off.

When the user's device 118 fails to communicate with the BTLE radio transmitter of the tracking device 104, the dog is determined to likely not be with the user 116. The tracking device 104 may then employ a higher power technology, such as, Wi-Fi radio to attempt to determine the dog's location. In these implementations, the tracking device 104 may switch off the BTLE radio transmitter and switch on the Wi-Fi radio to attempt to connect to one or more known Wi-Fi networks. The Wi-Fi radio may be configured to determine whether the user's predefined wireless SSID is within range of the tracker device 104. If the user's preferred wireless SSID is within the range of the tracking device 104 then the tracking device 104 may determine that the dog 114 is located within or near to the monitored property 102, e.g., the yard of property 102. If the tracking device 104 does not locate the user's wireless SSID, the tracking device 104 may attempt to locate one or more other SSIDs associated with the monitored property 102 or nearby properties. The tracking device 104 may be configured to scan for the one or more SSIDs within range of the device during the initial set up of the tracking device. The tracking device 104 may be configured to periodically scan for one or more additional SSIDs within range of the device, and may store the known SSIDs in a database. The tracking device may update the known SSIDs stored at the database based on the periodic scanning of the nearby SSIDs.

The tracking device 104 may switch off the Wi-Fi radio and switch on the cellular transceiver if the device 104 does not locate any known Wi-Fi networks. When the cellular connection is established, the tracking device 104 may send a notification to the cloud server. In some implementations, the cloud server may be a monitoring server that is in communication with the control unit 112 at the monitored property 102. In these implementations, the cloud server may communicate with the control unit 112, and instruct the control unit 112 to communicate a notification to the user device 118. In some implementations, the tracking device 104 may communicate directly with the user device 118 to send a notification. The notification may include the approximate location of the tracking device 104 determined using cell tower triangulation. The user 116 may locate the pet 114 based on the determined location.

The tracking device 104 may turn off the cellular transceiver and switch on the GPS radio if the location determined through triangulation is not sufficient. The GPS radio may determine the tracking device location and communicate the location information to the cloud server. The tracking device 104 may then reactive the cellular transceiver to communicate the location information to the cloud server, or in some examples, the tracking device 104 may not switch off the cellular transceiver, and may communicate the location information to the cloud server. In some implementations, the location information may also include the cellular triangulation information. The tracking device 104 may determine, based on the location and the movement of the dog 114, the frequency of which to send location information to the cloud server. The tracking device 104 may send location updates to the cloud less frequently when the user device 118 is not close to the location of the tracking device 104, and the frequency of the location updates may increase as the user device 118 moves closer to the tracking device 104. Increasing the frequency of the location updates is a very battery intensive operation and by reserving frequent updates until the user device 118 is close to the location of the tracking device 104 reduces the chances of the battery of the tracking device 104 dying before the user 116 is able to locate the dog 114. The battery life of the tracking device 104 is optimized by stepping through the differing technologies based on the power consumption of the technology. The most power consuming technology, GPS is reserved as the last option to determine the tracking device's location.

In some implementations, the user 116 may wish to receive periodic updates on the location of the dog 114 even when no triggering event has occurred. In these implementations, the tracking device 104 may utilize the BTLE radio transmitter to communicate with a Bluetooth device within the monitored property 102. For example, the location of the tracking device 104 is identified as being within the home once the tracking device 104 is communicating through Bluetooth to the control unit 112. In these examples, the control unit 112 may be a Bluetooth device that allows for such communication. The battery life of the tracking device 104 is optimized by consuming minimal power to activate the BTLE radio transmitter versus using larger amount of power to maintain the cellular transceiver in a standby mode to facilitate the tracking device 104 receiving instructions from the cloud server to report its location.

In some implementations, the tracking device 104 may include a panic button. The user 116 may attach the tracking device 104 to another user. For example, the user may attach the tracking device 104 to a child. If the panic button is pressed, the tracking device 104 may determine its location by ramping up through the one or more technologies based on the different power consumptions.

Figure 2:
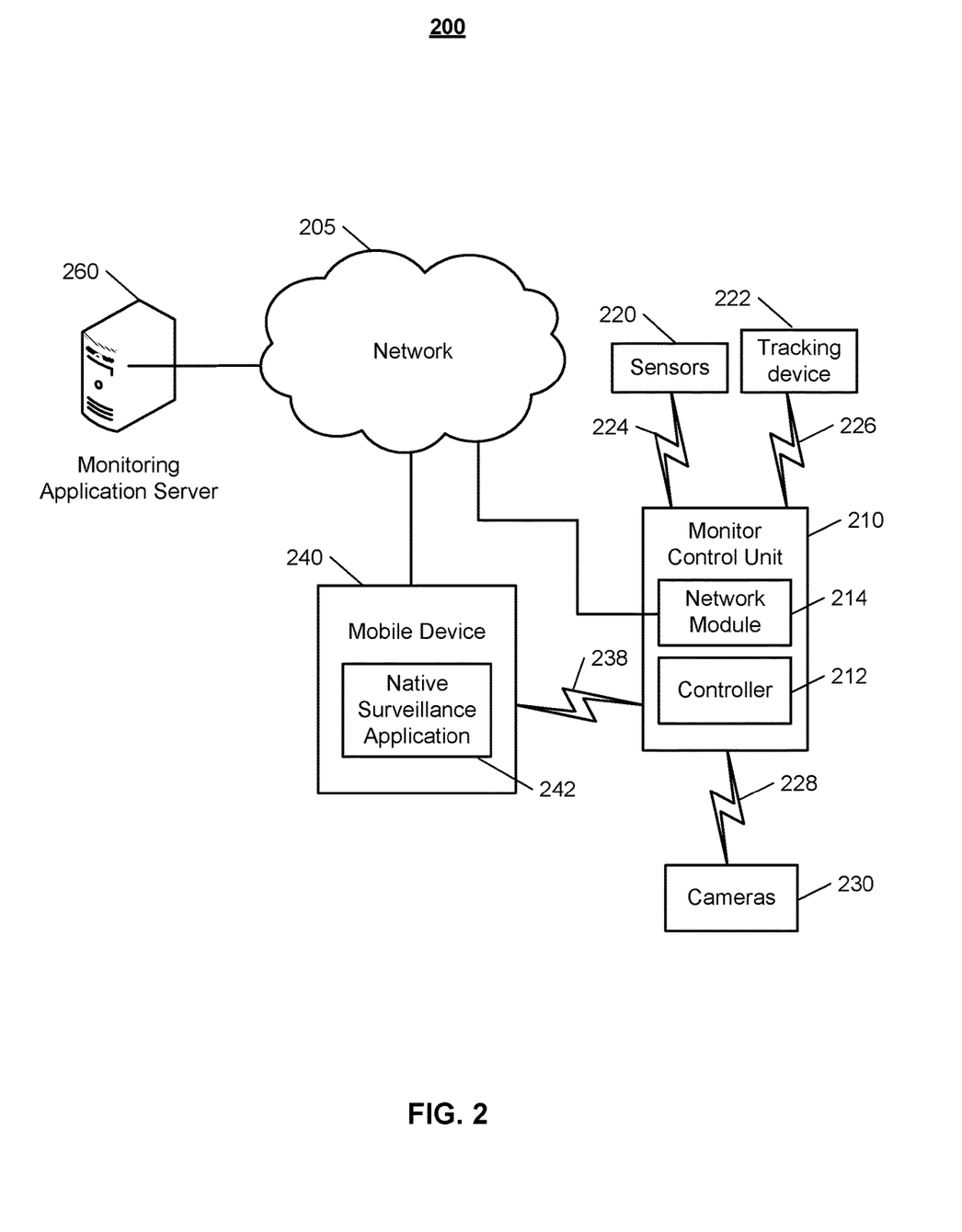
FIG. 2 illustrates an example of a monitoring system integrated with one or more tracking devices.

FIG. 2 illustrates an example of a system 200 configured to monitor a property. The system 200 includes a network 205, a monitoring system control unit 210, one or more user devices 240, and a monitoring application server 260. The network 205 facilitates communications between the monitoring system control unit 210, the one or more user devices 240, and the monitoring application server 260. The network 205 is configured to enable exchange of electronic communications between devices connected to the network 205. For example, the network 205 may be configured to enable exchange of electronic communications between the monitoring system control unit 210, the one or more user devices 240, and the monitoring application server 260. The network 205 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 205 may include multiple networks or subnetworks, each of which may include, for example, a wired or wireless data pathway. The network 205 may include a circuit-switched network, a packet-switched data network, or any other network able to carry electronic communications (e.g., data or voice communications). For example, the network 205 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 205 may include one or more networks that include wireless data channels and wireless voice channels. The network 205 may be a wireless network, a broadband network, or a combination of networks including a wireless network and a broadband network.

The monitoring system control unit 210 includes a controller 212 and a network module 214. The controller 212 is configured to control a monitoring system (e.g., a home alarm or security system) that includes the monitor control unit 210. In some examples, the controller 212 may include a processor or other control circuitry configured to execute instructions of a program that controls operation of an alarm system. In these examples, the controller 212 may be configured to receive input from cameras, sensors, detectors, or other devices included in the alarm system and control operations of devices included in the alarm system or other household devices (e.g., a thermostat, an appliance, lights, etc.). For example, the controller 212 may be configured to control operation of the network module 214 included in the monitoring system control unit 210.

The network module 214 is a communication device configured to exchange communications over the network 205. The network module 214 may be a wireless communication module configured to exchange wireless communications over the network 205. For example, the network module 214 may be a wireless communication device configured to exchange communications over a wireless data channel and a wireless voice channel. In this example, the network module 214 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 214 also may be a wired communication module configured to exchange communications over the network 205 using a wired connection. For instance, the network module 214 may be a modem, a network interface card, or another type of network interface device. The network module 214 may be an Ethernet network card configured to enable the monitoring control unit 210 to communicate over a local area network and/or the Internet. The network module 214 also may be a voiceband modem configured to enable the alarm panel to communicate over the telephone lines of Plain Old Telephone Systems (POTS).

The monitoring system may include multiple tracking devices 222 that may be affixed to one or more entities associated the monitored property. The one or more tracking devices 222 may include a long-range radio transceiver, such as CAT-M cellular transceiver, capable of wide-area wireless data connectivity. The long-range radio transceiver may be a high-power device that is not conducive to long battery life. The one or more tracking devices 222 may include a short-range radio transceiver, such as BTLE, which is a low power device that is conducive to long battery life the tracking device. The one or more tracking devices 222 may include a medium-range radio transceiver, such as Wi-Fi, which is a mid-power device. The one or more tracking device 22 may include a GPS transceiver, capable of providing satellite-based location information to the device, which is considered a mid-power device. The one or more tracking devices 222 may include an accelerometer with state machine, which may be configured to measure "proper acceleration," and may be configured to provide inertial information to the tracking device. The accelerometer of the tracking device may determine whether inertial changes match a profile of movement programmed in the state machine, and may be considered a near-zero-power device. The one or more trackers 222 may include a micro controller unit (MCU), which is a high-power device.

The monitoring system may include multiple sensors 220. The sensors 220 may include a contact sensor, a motion sensor, a glass break sensor, or any other type of sensor included in an alarm system or security system. The sensors 220 also may include an environmental sensor, such as a temperature sensor, a water sensor, a rain sensor, a wind sensor, a light sensor, a smoke detector, a carbon monoxide detector, an air quality sensor, etc. The sensors 220 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 220 may include a radio-frequency identification (RFID) sensor that identifies a particular article that includes a pre-assigned RFID tag.

The one or more cameras 230 may be a video/photographic camera or other type of optical sensing device configured to capture images. For instance, the one or more cameras 230 may be configured to capture images of an area within a building monitored by the monitor control unit 210. The one or more cameras 230 may be configured to capture single, static images of the area and also video images of the area in which multiple images of the area are captured at a relatively high frequency (e.g., thirty images per second). The one or more cameras 230 may be controlled based on commands received from the monitor control unit 210.

The sensors 220, the tracking device 222, and the cameras 230 communicate with the controller 212 over communication links 224, 226, and 228. The communication links 224, 226, and 228 may be a wired or wireless data pathway configured to transmit signals from the sensors 220, the tracking devices 222, and the cameras 230 to the controller 212. The communication link 224, 226, and 228 may include a local network, such as, 802.11 "Wi-Fi" wireless Ethernet (e.g., using low-power Wi-Fi chipsets), Z-Wave, Power Over Ethernet (POE), Zigbee, Bluetooth, "HomePlug" or other Powerline networks that operate over AC wiring, and a Category 5 (CAT5) or Category 6 (CAT6) wired Ethernet network.

The monitoring application server 260 is an electronic device configured to provide monitoring services by exchanging electronic communications with the monitor control unit 210, and the one or more user devices 240, over the network 205. For example, the monitoring application server 260 may be configured to monitor events (e.g., alarm events) generated by the monitor control unit 210. In this example, the monitoring application server 260 may exchange electronic communications with the network module 214 included in the monitoring system control unit 210 to receive information regarding events (e.g., alarm events) detected by the monitoring system control unit 210. The monitoring application server 260 also may receive information regarding events (e.g., alarm events) from the one or more user devices 240.

The one or more user devices 240 are devices that host and display user interfaces. The user device 240 may be a cellular phone or a non-cellular locally networked device with a display. The user device 240 may include a cell phone, a smart phone, a tablet PC, a personal digital assistant ("PDA"), or any other portable device configured to communicate over a network and display information. For example, implementations may also include Blackberry-type devices (e.g., as provided by Research in Motion), electronic organizers, iPhone-type devices (e.g., as provided by Apple), iPod devices (e.g., as provided by Apple) or other portable music players, other communication devices, and handheld or portable electronic devices for gaming, communications, and/or data organization. The user device 240 may perform functions unrelated to the monitoring system, such as placing personal telephone calls, playing music, playing video, displaying pictures, browsing the Internet, maintaining an electronic calendar, etc.

The user device 240 includes a native surveillance application 242. The native surveillance application 242 refers to a software/firmware program running on the corresponding mobile device that enables the user interface and features described throughout. The user device 240 may load or install the native surveillance application 242 based on data received over a network or data received from local media. The native surveillance application 242 runs on mobile devices platforms, such as iPhone, iPod touch, Blackberry, Google Android, Windows Mobile, etc. The native surveillance application 242 enables the user device 140 to receive and process image and sensor data from the monitoring system.

In some implementations, the one or more user devices 240 communicate with and receive monitoring system data from the monitor control unit 210 using the communication link 238. For instance, the one or more user devices 240 may communicate with the monitor control unit 210 using various local wireless protocols such as Wi-Fi, Bolt, Lora, Bluetooth, Z-Wave, Zigbee, "HomePlug," or other Powerline networks that operate over AC wiring, or Power over Ethernet (POE), or wired protocols such as Ethernet and USB, to connect the one or more user devices 240 to local security and automation equipment. The one or more user devices 240 may connect locally to the monitoring system and its sensors and other devices. The local connection may improve the speed of status and control communications because communicating through the network 205 with a remote server (e.g., the monitoring application server 260) may be significantly slower.

Although the one or more user devices 240 are shown as communicating with the monitor control unit 210, the one or more user devices 240 may communicate directly with the sensors and other devices controlled by the monitor control unit 210. In some implementations, the one or more user devices 240 replace the monitoring system control unit 210 and perform the functions of the monitoring system control unit 210 for local monitoring and long range/offsite communication.

Figure 3:
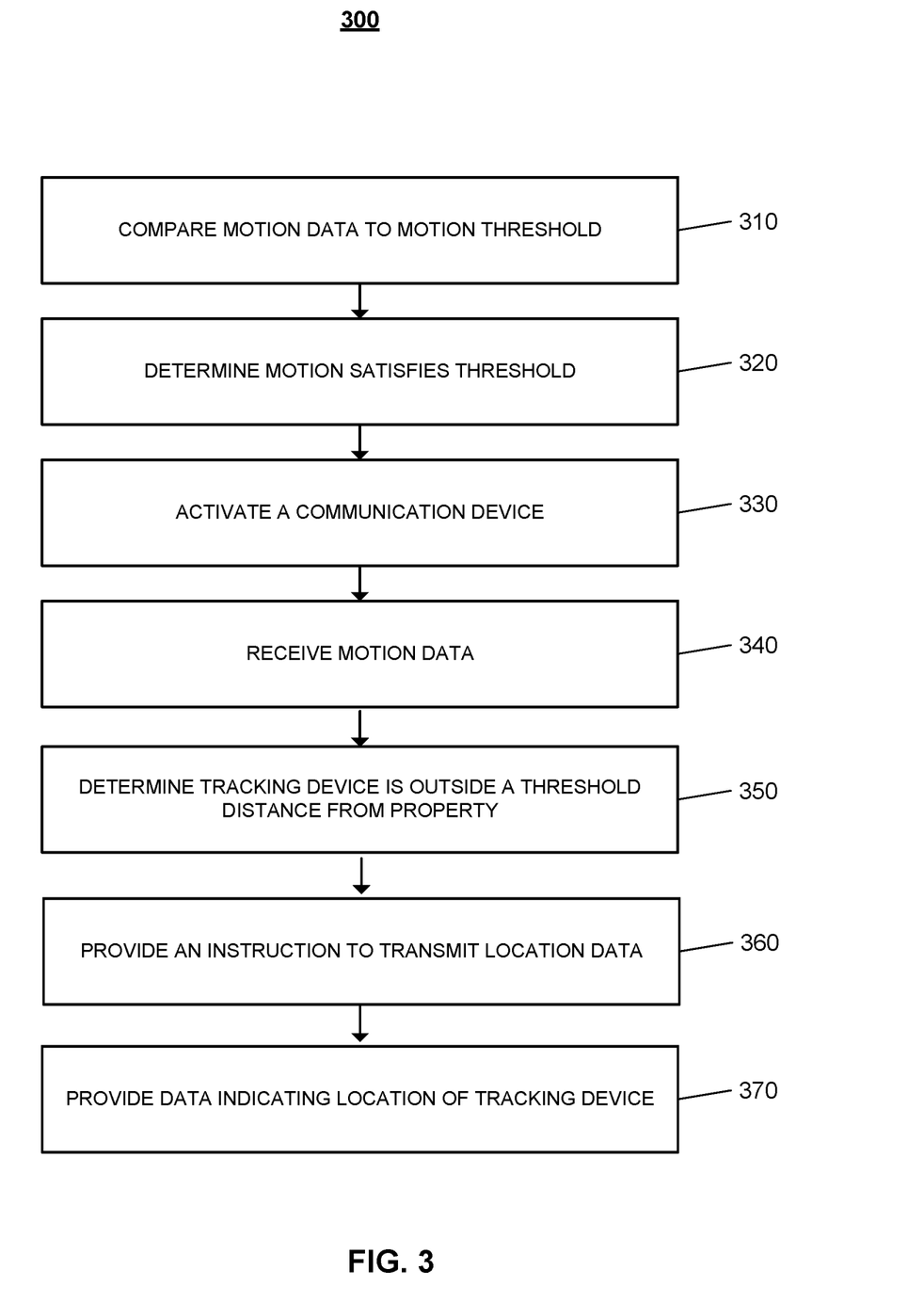
FIG. 3 is a flow chart of an example for providing data indicating a location of a tracking device.

FIG. 3 illustrates an example process for providing data indicating the location of a tracking device. A tracking device may be affixed to one or more entities associated with the monitored property. For example, the user may affix a tracking device to a child, a vehicle, or to a pet associated with the monitored property. The tracking device is battery powered, and may include one or more communication devices that each use a differing amount of energy. The tracking device may include a motion sensor, a Bluetooth low energy radio (BTLE), a Wi-Fi radio transceiver, a cellular transceiver, and a GPS transceiver. The tracking device is configured to optimize the battery life of the device by communicating by the communication technology that requires the least amount of energy.

The motion sensor of the tracking device is configured to compare the motion data to a motion threshold (310). The motion sensor of the tracking device may be an accelerometer and is considered a near-zero-power device since it consumes very little power. The motion sensor consumes the lowest amount of power and may constantly be powered on. The motion sensor is configured to detect motion data and compare the detected motion to a motion threshold. The motion threshold may be determined based on the size of the indoor space of the property, and the linear distance that an object, with an attached tracker, could possible move within the property. The motion sensor determines that the motion data satisfies the motion threshold based on comparing the motion data to the motion threshold (320).

The motion sensor activates a communication device that when active consumes more power than the motion sensor, based on determining that the motion data satisfies a motion threshold (330). The motion sensor activates the next lowest power consumption device of the tracking device, the Bluetooth low energy radio (BTLE), when the motion detected by the motion sensor satisfies the motion threshold. When the Bluetooth radio is activated, the tracking device attempts to communicate with one or more known Bluetooth devices. For example, the tracking device may attempt to communicate with the user device of a resident of the property.

The monitor control unit receives motion data from the tracking device (340). The tracking device may communicate the motion data to the monitor control unit. The monitor control unit determines that the tracking device is outside of a threshold distance of the property based on the motion data. The monitor control unit compares the distance the tracking device travelled, represented by the received motion data, to a distance from the monitored property, and determines the tracking device is outside of the threshold distance from the property.

The monitor control unit determines that the tracking device is outside of a threshold distance from the property (350). The monitor control unit determines the tracking device is outside of the threshold from the property when the distance travelled by the tracking device, as indicated by the received motion data, exceeds the threshold distance. For example, the motion data may indicate that the tracking device travelled 100 meters in a linear direction, and the threshold distance may be a 50-meter radius around the property. In this example, the monitor control unit determines the tracking device is outside of the threshold distance from the property.

The monitor control unit provides, for output to the tracking device, an instruction to transmit location data at a particular frequency (360). The tracking device receives the instruction from the monitor control unit, and the tracking device outputs the location data at a particular frequency. When the tracking device activates the Bluetooth radio, the tracking device attempts to communicate with one or more known Bluetooth devices in an attempt to determine the location of the tracking device. When the tracking device successfully communicates with at least one known Bluetooth device, the location the tracking device is determined to be within a threshold distance from the Bluetooth device the tracking device is in communication with. For example, the tracking device successfully communicates with the user device of a resident, the tracking device is determined to be within a threshold distance from the user device.

The tracking device may attempt to communicate with the one or more known Bluetooth devices for a predetermined period of time. For example the tracking device may attempt to communicate with one or more known Bluetooth devices for 60 seconds. When the tracking device fails to successfully communicate with at least one known Bluetooth device during the predetermined period of time, the tracking device deactivates the Bluetooth radio, and activates the next lowest energy consumption technology, the Wi-Fi radio. The tracking device attempts to communicate with one or more known Wi-Fi networks when the Wi-Fi radio is activated. For example, the tracking device may attempt to communicate with the Wi-Fi network at the monitored property. In some examples, the tracking device may attempt to communicate with the Wi-Fi network of a neighboring property. The tracking device may successfully communicate with at least one known Wi-Fi network, and the location of the tracking device is determined to be within a threshold distance from the server of the Wi-Fi network. For examples, the tracking device may successfully connect with the Wi-Fi network of a neighboring property, and the tracking device is determined to be within a threshold distance from the neighboring property.

In some implementations, the monitor control unit may user triangulation techniques to determine the location of the tracking device based on connection to one or more Wi-Fi networks. In some implementations, the tracking device may attempt to communicate with known and unknown Wi-Fi networks. In these implementations, the tracking device may firstly attempt to connect with the one or more known Wi-Fi networks, and then may attempt to connect with at least one Wi-Fi unknown network. The tracking device may attempt to communicate with one or more unsecured Wi-Fi networks.

The tracking device may attempt to communicate with the one or more Wi-Fi networks for a predetermined period of time. The tracking device deactivates the Wi-Fi radio and activates the cellular radio when the tracking device fails to successfully communicate with at least one known Wi-Fi network during the predetermined period of time. For example, the tracking device activates the cellular radio when the tracking device fails to communicate with a Wi-Fi network within 60 seconds. The tracking device attempts to connect to a cellular network when the cellular radio is activated. The cellular radio of the tracking device remains active until the location of the tracking device is identified. When the tracking device is connected to a cellular network, the tracking device transmits its location data at a particular frequency. In some examples, the location data may be communicated to a user device of the resident of the property. The tracking device may be configured to communicate its location data to monitor control unit at a first frequency based on the distance between the tracking device and the user device of a resident, and may communicate the location data to the monitor control unit at a second higher frequency, based on the distance between the tracking device and the user device decreasing.

The monitor control unit provides for output, data indicating the location of the tracking device (370). The monitor control unit may determine the location of the tracking device using cellular network access point multilateration (cellular triangulation) when the tracking connects with a cellular network. In some examples, the tracking device may communicate its GPS coordinates to the monitor control unit. The tracking device may communicate its GPS coordinates to the user device of a resident of the property. In some implementations, when the tracking device is determined to be within a threshold distance from the user device of the resident, the tracking device may output a beeping sound to alert the user. In these implementations, the tracking device may output the beeping sound at a higher frequency as the distance between the tracking device and the user device decreases.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

The invention claimed is:

1. A monitoring system that is configured to monitor a property, the monitoring system comprising:
a tracking device that includes a motion sensor that is configured to generate motion data that reflects movement of the tracking device and a communication device, the tracking device being configured to:
compare the motion data to a motion threshold;
based on comparing the motion data to the motion threshold, determine that the motion data satisfies the motion threshold; and
based on determining that the motion data satisfies the motion threshold, activate the communication device; and
a monitor control unit that is configured to:
provide, for output to the tracking device, an instruction to transmit location data at a particular frequency;
determine a location of a user device of a resident of the property;
determine, at a first time and using the location data of the tracking device transmitted at the particular frequency, a first distance between the user device of the resident and the tracking device;
determine, at a second time that is after the first time and using the location data of the tracking device transmitted at the particular frequency, a second distance between the user device of the resident and the tracking device;
determine that the second distance is less than the first distance; and
based on determining that the second distance is less than the first distance, provide, for output to the tracking device, an instruction to transmit location data at a greater frequency than the particular frequency.

2. The system of claim 1, wherein the communication device is a short-range radio.

3. The system of claim 2, wherein:
the short-range radio is configured to:
determine, at the particular frequency, another short-range radio device that is in a vicinity of the tracking device, and
the tracking device is configured to:
determine that the other short-range radio device is a known short-range radio device; and
based on determining that the other short-range radio device is a known short-range radio device, provide, for output, location data that indicates that the tracking device is located within range of the known short-range radio device.

4. The system of claim 2, wherein:
the short-range radio is configured to determine, at the particular frequency, another short-range radio device that is within range of the tracking device,
the tracking device is configured to determine that the other short-range radio device is not a known short-range radio device,
the tracking device includes:
a wireless local area networking transceiver device that is configured to:
based on determining that the other short-range radio device is not a known short-range radio device, determine a wireless network that is within range of the tracking device, and
the tracking device is configured to:
determine that the wireless network is a known wireless network; and
based on determining that the wireless network is a known wireless network, provide, for output, location data that indicates that the tracking device is located within range of the known wireless network.

5. The system of claim 2, wherein:
the short-range radio is configured to determine, at the particular frequency, another short-range radio device that is within range of the tracking device,
the tracking device is configured to determine that the other short-range radio device is not a known short-range radio device,
the tracking device includes:
a wireless local area networking transceiver device that is configured to:
based on determining that the other short-range radio device is not a known short-range radio device, determine a wireless network that is within range of the tracking device,
the tracking device is configured to determine that the wireless network is not a known wireless network,
the tracking device includes:
a cellular radio that is configured to:
based on determining that the wireless network is not a known wireless network, determine a location of the tracking device using cellular network access point multilateration, and
the tracking device is configured to provide, for output, location data that indicates the location of the tracking device using cellular network access point multilateration.

6. The system of claim 2, wherein:
the tracking device includes:
a wireless local area networking transceiver; and
a cellular radio; and
the tracking device is configured to:
communicate using the short-range radio, the wireless local area networking transceiver, or the cellular radio that is within range of a known device and consumes a lowest amount of power.

7. The system of claim 1, wherein:
the motion sensor comprises an accelerometer that is configured to generated accelerometer data, and
the monitor control unit is configured to:
receive the motion data by receiving the accelerometer data from the accelerometer.

8. The system of claim 1, wherein the communication device is configured to:
generate the location data by analyzing the motion data; and
provide, for output, the location data.

9. The system of claim 1, wherein the monitor control unit is configured to provide, for output, data indicating the location of the tracking device at the particular frequency.

10. The system of claim 1, wherein the monitor control unit is configured to communicate location data of the tracking device to the user device of the resident at the greater frequency.

11. A computer-implemented method, comprising:
generating, by a tracking device that is included in a monitoring system and that includes a motion sensor and a communication device, motion data that reflects movement of the tracking device;
comparing, by the tracking device, the motion data to a motion threshold;
based on comparing the motion data to the motion threshold, determining, by the tracking device, that the motion data satisfies the motion threshold;
based on determining that the motion data satisfies the motion threshold, activating, by the tracking device, the communication device; and
providing, by the monitoring system and for output to the tracking device, an instruction to transmit location data at a particular frequency;
determining, by the monitoring system, a location of a user device of a resident of the property;
determining, at a first time and using the location data of the tracking device transmitted at the particular frequency, a first distance between the user device of the resident and the tracking device;
determining, at a second time that is after the first time and using the location data of the tracking device transmitted at the particular frequency, a second distance between the user device of the resident and the tracking device;
determining, by the monitoring system, that the second distance is less than the first distance; and
based on determining that the second distance is less than the first distance, provide, by the monitoring system and for output to the tracking device, an instruction to transmit location data at a greater frequency than the particular frequency.

12. The method of claim 11, wherein the communication device is a short-range radio.

13. The method of claim 12, further comprising:
determining, by the short-range radio at the particular frequency, another short-range radio device that is in a vicinity of the tracking device, and
determining, by the tracking device, that the other short-range radio device is a known short-range radio device; and
based on determining that the other short-range radio device is a known short-range radio device, providing, for output, location data that indicates that the tracking device is located within range of the known short-range radio device.

14. The method of claim 12, further comprising:
determining, by the short-range radio at the particular frequency, another short-range radio device that is within range of the tracking device,
determining, by the tracking device, that the other short-range radio device is not a known short-range radio device,
based on determining that the other short-range radio device is not a known short-range radio device, determining, by a wireless local area networking transceiver device of the tracking device, a wireless network that is within range of the tracking device, and
determining, by the tracking device, that the wireless network is a known wireless network; and
based on determining that the wireless network is a known wireless network, providing, for output, location data that indicates that the tracking device is located within range of the known wireless network.

15. The method of claim 12, further comprising:
determining, by the short-range radio at the particular frequency, another short-range radio device that is within range of the tracking device,
determining, by the tracking device, that the other short-range radio device is not a known short-range radio device,
based on determining that the other short-range radio device is not a known short-range radio device, determining, by a wireless local area networking transceiver device of the tracking device, a wireless network that is within range of the tracking device,
determining that the wireless network is not a known wireless network,
based on determining that the wireless network is not a known wireless network, determining, by a cellular radio of the tracking device, a location of the tracking device using cellular network access point multilateration, and
providing, for output, location data that indicates the location of the tracking device using cellular network access point multilateration.

16. The method of claim 12, wherein:
the tracking device includes:
a wireless local area networking transceiver; and
a cellular radio; and
the method further comprising:
communicating using the short-range radio, the wireless local area networking transceiver, or the cellular radio that is within range of a known device and consumes a lowest amount of power.

17. The method of claim 11, wherein the motion sensor comprises an accelerometer that is configured to generated accelerometer data, and wherein receiving the motion data comprises receiving the accelerometer data from the accelerometer.

18. The method of claim 11, further comprising:
generating, by the tracking device, the location data by analyzing the motion data; and
providing, for output, the location data.

19. The method of claim 11, further comprising providing, for output, data indicating the location of the tracking device at the particular frequency.

20. The method of claim 11, further comprising communicating, by the monitoring system, location data of the tracking device to the user device of the resident at the greater frequency.

* * * * *